United States Patent
Skallerud

(10) Patent No.: US 9,484,742 B2
(45) Date of Patent: Nov. 1, 2016

(54) POWER SUPPLY SYSTEM FOR MOUNTING TO A RAIL

(75) Inventor: Erling Berre Skallerud, Vettre (NO)

(73) Assignee: Eltek Valere AS, Drammen (NO)

( * ) Notice: Subject to any disclaimer, the term of this patent is extended or adjusted under 35 U.S.C. 154(b) by 1419 days.

(21) Appl. No.: 13/147,739

(22) PCT Filed: Feb. 3, 2010

(86) PCT No.: PCT/NO2010/000040
§ 371 (c)(1),
(2), (4) Date: Oct. 18, 2011

(87) PCT Pub. No.: WO2010/090528
PCT Pub. Date: Aug. 12, 2010

(65) Prior Publication Data
US 2012/0025607 A1 Feb. 2, 2012

Related U.S. Application Data

(60) Provisional application No. 61/149,890, filed on Feb. 4, 2009.

(30) Foreign Application Priority Data

Feb. 4, 2009 (GB) .................................. 0901852.4

(51) Int. Cl.
*H02J 1/10* (2006.01)
*H02J 9/06* (2006.01)

(52) U.S. Cl.
CPC .................. *H02J 1/10* (2013.01); *H02J 9/061* (2013.01); *Y10T 307/344* (2015.04)

(58) Field of Classification Search
CPC ........ H02J 1/10; H02J 9/061; Y10T 307/344
USPC .......................................................... 307/23
See application file for complete search history.

(56) References Cited

U.S. PATENT DOCUMENTS 4,829,224 A * 5/1989 Gandelman et al. .......... 320/116
5,615,079 A * 3/1997 Eggert ................. H01R 9/2675
361/601

(Continued)

FOREIGN PATENT DOCUMENTS

CN 1326261 A 12/2001
DE 4012307 A1 10/1991

(Continued)

OTHER PUBLICATIONS

International Search Report issued in PCT/NO2010/000040, mailed on May 6, 2010, 5 pages.

(Continued)

*Primary Examiner* — Jared Fureman
*Assistant Examiner* — Alfonso Perez Borroto
(74) *Attorney, Agent, or Firm* — Osha Liang LLP

(57) ABSTRACT

Power supply system for mounting to a rail has an AC/DC converter for converting high voltage AC power to low voltage DC power a controller for controlling the power supply system, an AC/DC converter and controller module for mounting to the rail and for connection to the AC/DC converter and controller respectively, and a battery connection and LVBD contactor module for mounting to the rail and for connection to a first battery, wherein the battery connection and LVBD contactor module on a first side is connected to the AC/DC converter and controller module by a first connection interface and where the battery connection and LVBD contactor module on a second side, opposite of the first side, has a first connector of a second connection interface.

20 Claims, 8 Drawing Sheets

(56) References Cited

U.S. PATENT DOCUMENTS

| | | | |
|---|---|---|---|
| 5,616,968 A * | 4/1997 | Fujii et al. ................ 307/66 |
| 6,392,319 B1 * | 5/2002 | Zebermann .......... H01R 9/2675 |
| | | | 307/147 |
| 6,424,547 B2 | 7/2002 | Murabayashi et al. |
| 6,816,466 B1 * | 11/2004 | Daniel .......................... 370/254 |
| 6,856,047 B2 | 2/2005 | Murabayashi et al. |
| 6,937,461 B1 * | 8/2005 | Donahue, IV ....... H01R 13/514 |
| | | | 174/50 |
| 2002/0173188 A1 * | 11/2002 | Follingstad .......... H01H 23/006 |
| | | | 439/188 |
| 2008/0030078 A1 | 2/2008 | Whitted et al. |
| 2009/0213544 A1 * | 8/2009 | Dittus ................ H05K 7/20727 |
| | | | 361/695 |

FOREIGN PATENT DOCUMENTS

| EP | 1160952 A2 | 12/2001 |
| JP | 10-257768 A | 9/1998 |

OTHER PUBLICATIONS

Written Opinion issued in PCT/NO2010/000040, mailed on May 6, 2010, 6 pages.

International Preliminary Report on Patentability issued in PCT/NO2010/000040, dated May 20, 2011, 6 pages.

Response to Written Opinion filed in PCT/NO2010/000040, dated Nov. 30, 2010, 2 pages.

Search Report issued by the UK Patent Office in priority application No. GB0901852.4, dated Jun. 4, 2009, 1 page.

English Translation of Chinese Search Report Issued in Application No. 201080006479.X, Dated: Apr. 10, 2013 (2 Pages).

* cited by examiner

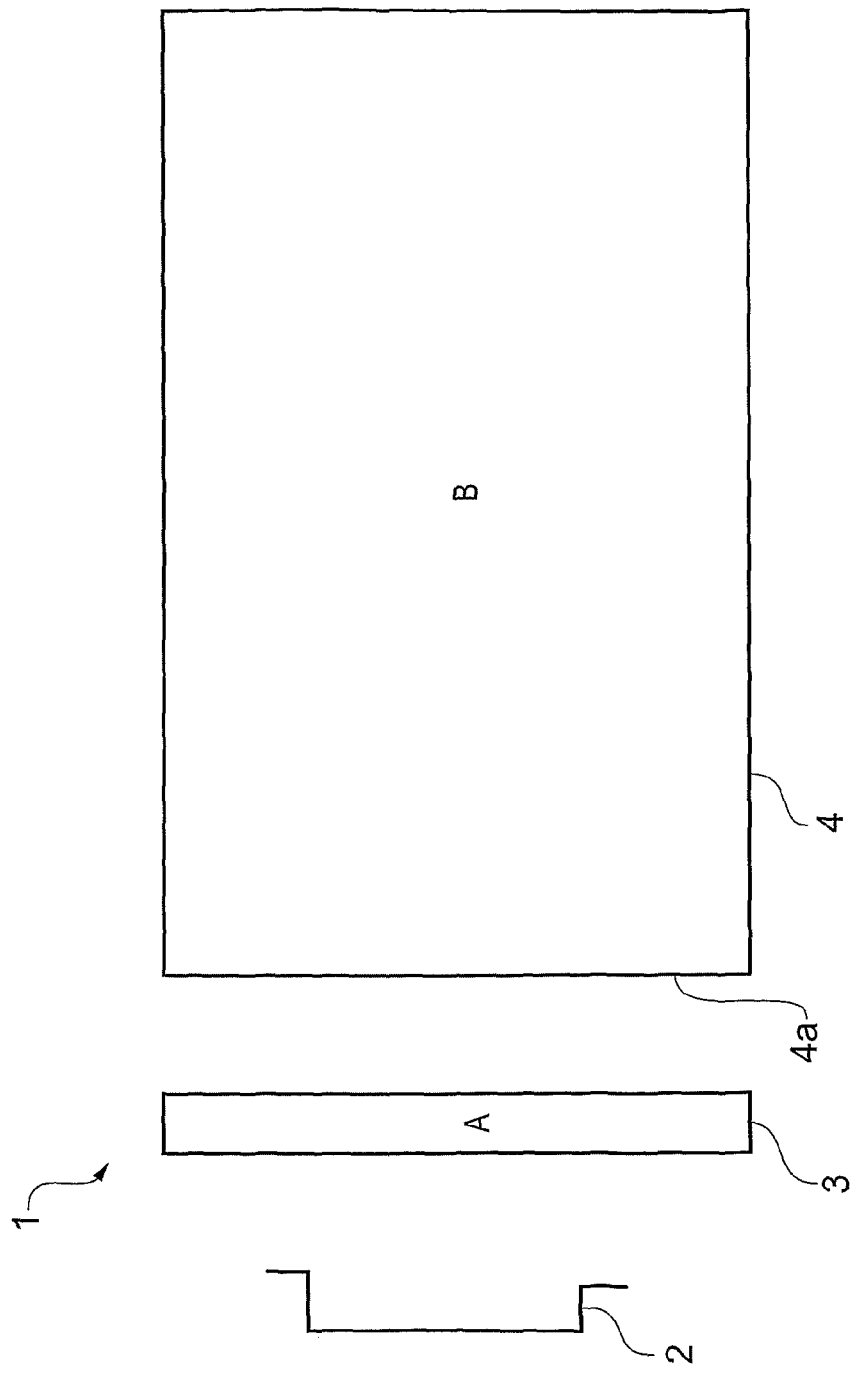

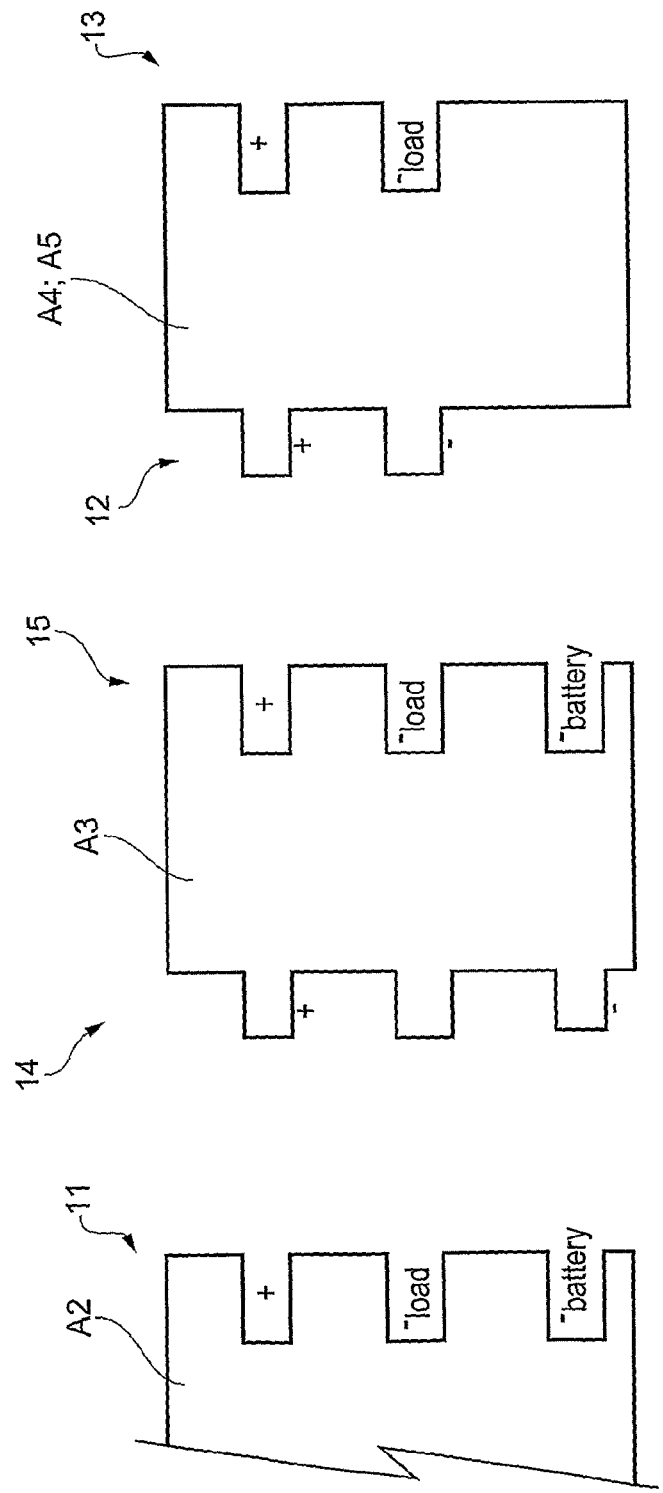

POWER SUPPLY SYSTEM FOR MOUNTING TO A RAIL

FIELD OF THE INVENTION

The present invention relates to a power supply system for mounting to a rail. More specifically, the power supply is mounted to a standard or custom rail of a power supply and equipment cabinet, equipment racks etc. In many applications, the rail would be a standard DIN rail.

TECHNICAL BACKGROUND

Different types of power supply systems are used to supply electrical power to different loads, such as industrial equipment, telecommunication equipment, broadband, cable TV, internet equipment etc. The power supply system typically comprises an AC/DC converter for converting high voltage AC power from the mains to low voltage DC power supplied to the load. The power supply system also comprises a battery for storing power as backup in case of a power failure in the mains. A controller is used to control the power system, for example to control that the DC voltage is within the limits required by the load and batteries.

Under some circumstances, for example if the battery energy reserve is below a certain level, it may be beneficial to disconnect certain loads to extend the operation time of more prioritized loads. Here, one or several loads must be disconnected so that the battery time can be increased. One disadvantage of known power supply systems is that they are not possible to reconfigure, or it is cumbersome to reconfigure them (i.e. for example if more load should be connected to the power supply system etc).

SUMMARY OF THE INVENTION

One or more embodiments of the invention provides a flexible power supply system that is easy to install and to reconfigure, so that the users/owners themselves are able to install the power supply system in a correct way. Moreover, one or more embodiments of the invention provides a power supply system where it is possible to prioritize the loads, i.e. to decide which loads that should be disconnected first if needed. One or more embodiments of the present invention standardizes the components of the system, i.e. to reduce the total number of components while still being able to adapt the system to the customers need.

A power supply system for mounting to a rail according to one or more embodiments of the present invention comprises an AC/DC converter for converting high voltage AC power to low voltage DC power and a controller for controlling the power supply system; wherein the system comprises:

an AC/DC converter and controller module for mounting to the rail and for connection to the AC/DC converter and controller respectively;
a battery connection and LVBD contactor module for mounting to the rail and for connection to a first battery, where the battery connection and LVBD contactor module on a first side is connected to the AC/DC converter and controller module by means of a first connection interface and where the battery connection and LVBD contactor module on a second side, opposite of the first side, comprises a first connector of a second connection interface;
a first load connection module for mounting to the rail and for connection to a first load, where the first load connection module on a first side comprises a second connector of the second connection interface and on a second side, opposite of the first side, comprises a third connector of the second connection interface, where the second connector of the first load connection module is connected to first connector on the second side of the battery connection and LVBD contactor module;
where the LVBD contactor of the battery connection and LVBD contactor module is provided for controlled connection or disconnection of the first battery; and
where the first and second connection interfaces comprises DC power terminals for transferring DC power and signal terminals for transferring control signals.

In an aspect of the invention, the first load connection module is a load connection and LD contactor module comprising an LD contactor provided for controlled connection or disconnection of the load being connected to the load connection and LD contactor module and, if present, subsequent load connection modules connected to the third connector on the second side of the load connection and LD contactor module.

In an aspect of the invention, one or more load connection modules or load connection and LD contactor modules are connected subsequent to the first load connection module for connection of more load to the power supply system.

In an aspect of the invention, a battery connection module is mounted to the rail and is connected between the battery connection and LVBD contactor module and the first load connection module for connection of more batteries to the power supply system.

In an aspect of the invention, the battery connection module on a first side comprises a fourth connector for connection to the first connector of the battery connection and LVBD contactor module and on a second side, opposite of the first side, comprises a fifth connector equal to the first connector for connection to the second connector of the first load connection module.

In an aspect of the invention, the second connector of one module may be connected to the first connector, the fifth connector or the third connector of another module.

In an aspect of the invention, the fourth connector of a module may be connected to the first connector or a fifth connector of another module, but may not be connected to the third connector of another module.

In an aspect of the invention, the DC power terminals of the first, third and fifth connectors are female connectors and the DC power terminals of the second and fourth connectors are male connectors or vice versa.

In an aspect of the invention, the first, fourth and fifth connectors comprise three DC power terminals, a positive terminal, a negative load terminal and a negative battery terminal.

In an aspect of the invention, the second and third connectors comprise two DC power terminals: the positive terminal, and the negative load terminal.

In an aspect of the invention, the load is connected to the load connection module by means of one or several MCBs.

In an aspect of the invention, the battery is connected to the battery connection and LVBD contactor module or, if present, the battery connection module, by means of one or several MCBs.

In an aspect of the invention, the AC/DC converter and controller module is connected to several AC/DC converters.

BRIEF DESCRIPTION OF THE DRAWINGS

FIG. 1a illustrates a schematic side view of the main components of the system according to one or more embodiments of the invention;

FIG. 7a illustrates the connectors of the second side of the battery connection and LVBD contactor module;

FIG. 7b illustrates the connectors of the first and second side of the battery connection module;

FIG. 7c illustrates the connectors of the first and second side of the load connection module.

DETAILED DESCRIPTION

Embodiments of a power supply system according to the present invention will be described with reference to the accompanying drawings In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

It is now referred to FIG. 1a, where a power supply system 1 according to a first embodiment is shown. The power supply system comprises an AC/DC converter for converting high voltage AC power from the mains to a low voltage DC power for supply to one or several loads. The power supply system also comprises a controller for controlling the power supply system. In the following, the AC/DC converter and the controller are considered known for a skilled person.

It is also shown a rail 2, which is typically a standard DIN rail or another type of rail that is suitable for mounting equipment to. The rail is for example fixed inside a power supply and equipment cabinet, equipment racks etc, or fixed to a wall.

Modules 3, hereinafter generally denoted with the letter A, are mounted to the rail 2. The modules 3 may be mounted to the rail by means of screws, clamping means or any other fastening means. The modules 3 comprise connection interfaces for connection to other modules 3 being mounted to the rail 2, as will be described further below.

Figure 1B:
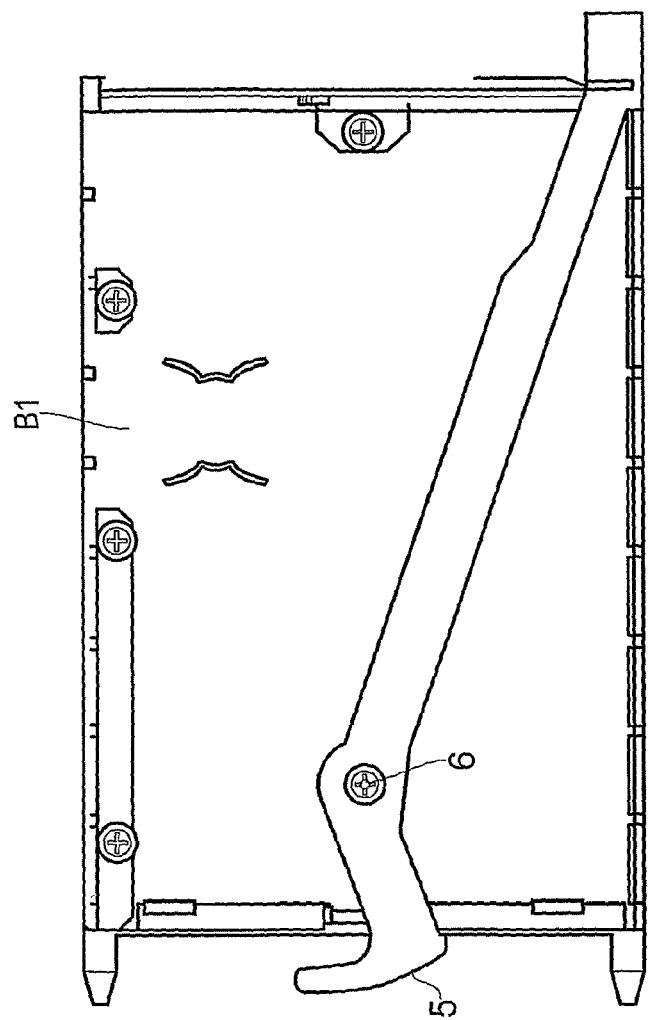
FIG. 1b illustrates a side view of the rail, the AC/DC converter and controller module A1 and the AC/DC converter B1.
Figure 1B:
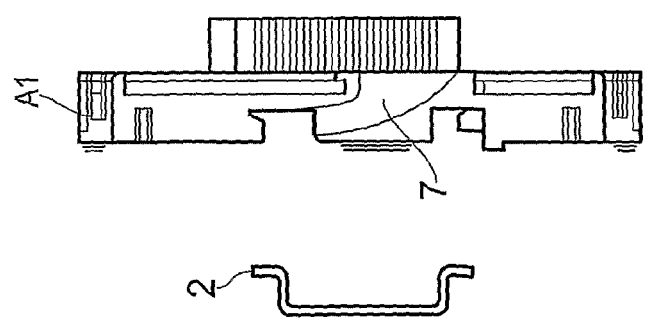

Electrical equipment 4, hereinafter generally denoted with the letter B, is connected on the outside of the modules 3 with respect to the rail 2, as shown in FIG. 1, by means of connection interfaces on the rear side 4a of the equipment 4. The electrical equipment 4 may for example releasably connected to the module, as will be described in detail below. The electrical equipment 4 may be mechanically and electrically connected directly to the outside of the modules, as indicated in FIGS. 1a and 1b, or may be electrically connected to the modules, for example by means of cables. In the description below, electrical equipment 4 comprises AC/DC converter(s), the controller, load and battery.

In FIG. 1b it is shown that the AC/DC converter hereinafter denoted as B1 comprises a hook device 5 rotatable about a pivot 6. The AC/DC converter B1 is first inserted onto or connected to its module, hereinafter denoted as A1, as described above. The module A1 is comprising a slit 7, adapted for receiving the hook device 5 and thereby a releasable locking between the module A1 and the AC/DC converter B1 is provided.

First Embodiment

A1-A2-A4

Figure 2:
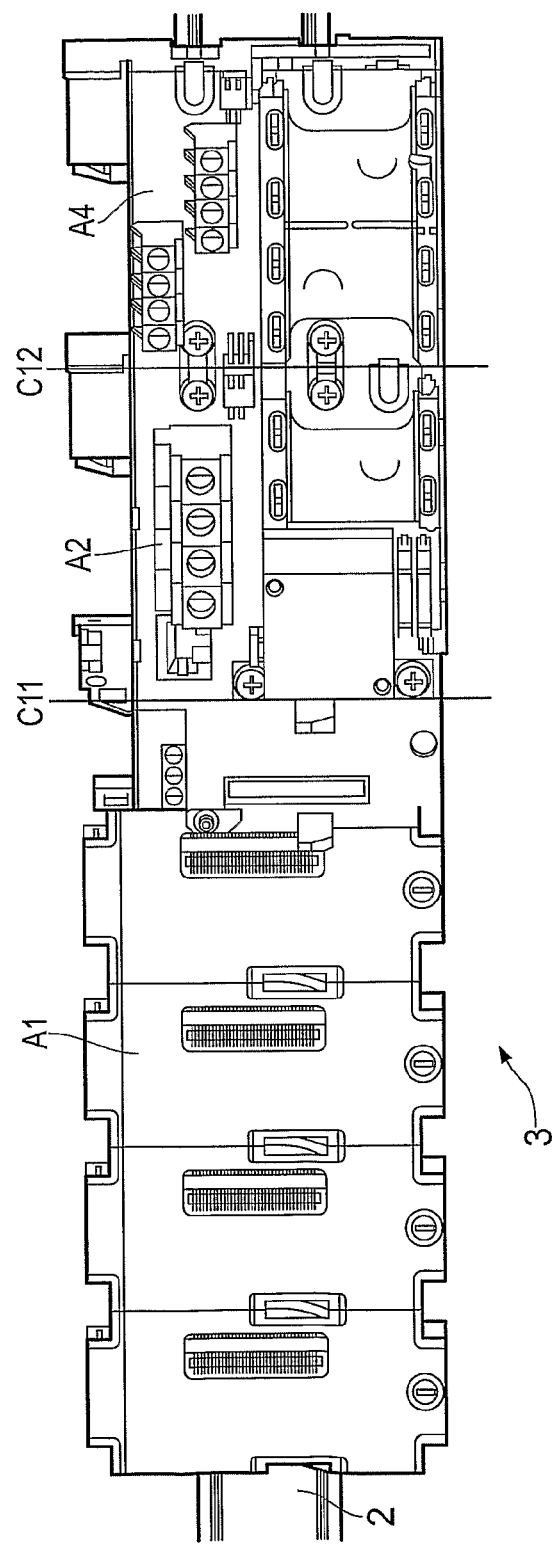
FIG. 2 illustrates a perspective view of the modules mounted to the rail according to a first embodiment.
Figure 3:
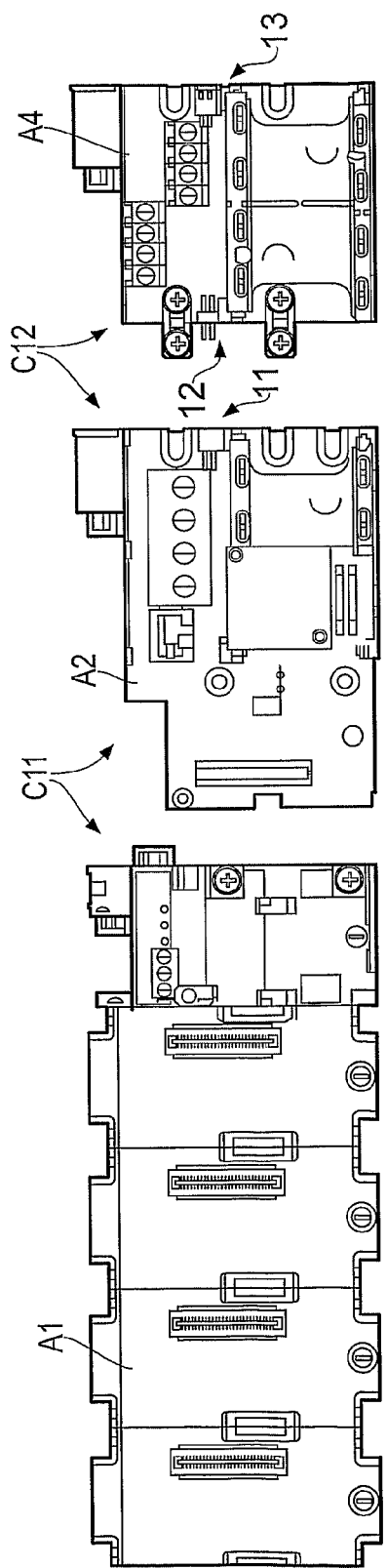
FIG. 3 illustrates a front view of the modules in FIG. 2 separated from each other.
Figure 4:
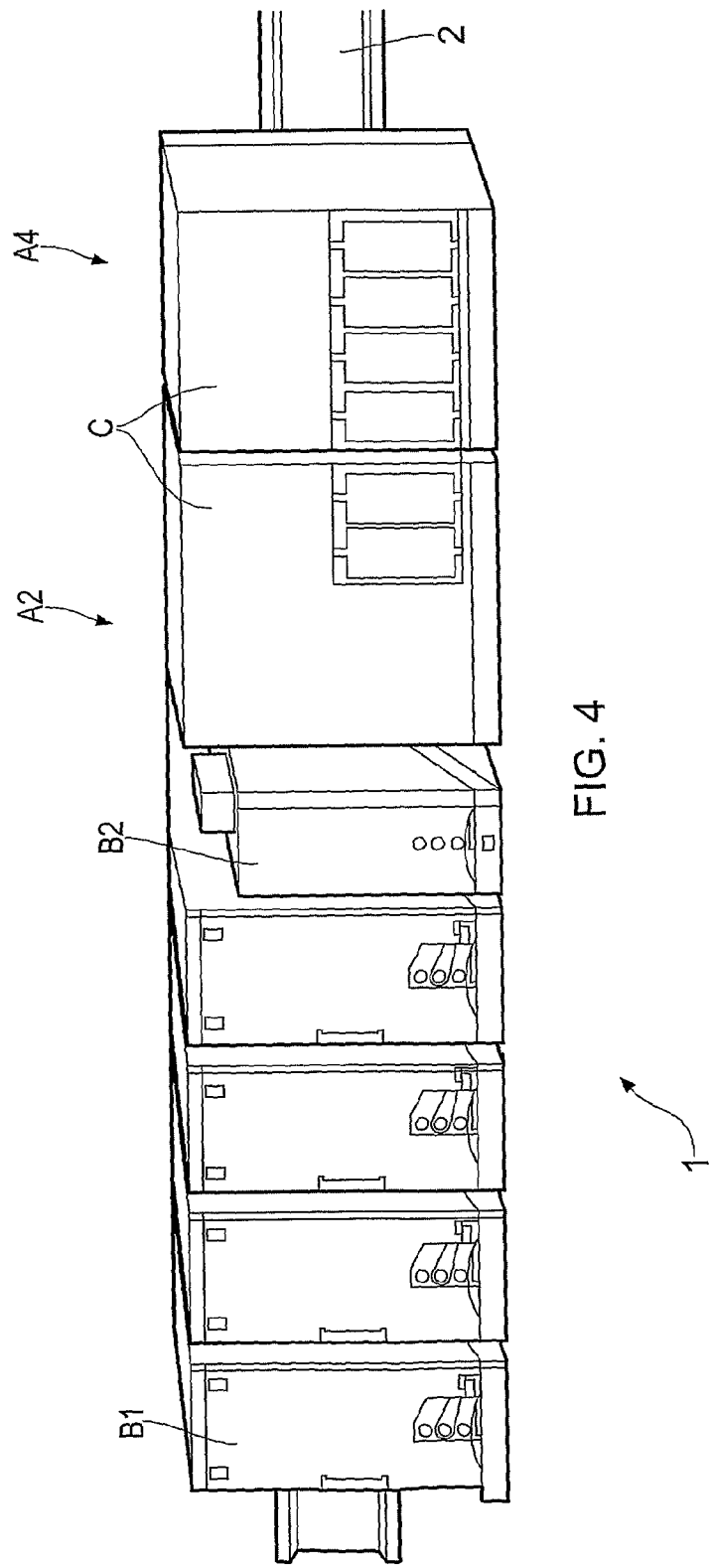
FIG. 4 illustrates a perspective view of the electrical units mounted to the modules of FIG. 2.

It is now referred to FIG. 2-4, illustrating a first embodiment of the power supply system comprising three modules 3. It should be noted that FIGS. 2-4 also illustrates a practical order for mounting of the power supply system to the rail 2. In the description below, the term "first side" corresponds to the left side of the modules, while the term "second side" corresponds to the right side of the modules, i.e. the respective first sides is on the opposite side of the respective second sides of the modules.

The first module 3 is an AC/DC converter and controller module A1 for connection between the rail and the AC/DC converter and controller respectively. The AC/DC converter and controller module A1 should be mounted near a first end of the rail 2, for example near the left end as shown in the FIG. 2. On its second side, the AC/DC converter and controller module A1 comprises a first connection interface CI1.

The second module 3 is a battery connection and LVBD (Low Voltage Battery Disconnect) contactor module A2 for mounting to the rail and for connection to a first battery. The battery connection and LVBD contactor module A2 is on its first side connected to the AC/DC converter and controller module A1 by means of the first connection interface CI1. On its second side, the battery connection and LVBD contactor module A2 comprises a first connector 11 of a second connection interface CI2. It should be noted that parts of the module A2 is located behind module A1 when comparing FIG. 2 with FIG. 3.

The battery connection and LVBD contactor module A2 comprises a LVBD (Low Voltage Battery Disconnect) contactor for controlled connection or disconnection of the first battery, as will be described below. In this embodiment, it is the controller B2 that, based on certain conditions, performs the actuation of the LVDB contactor. The LVBD function is provided for protecting the battery from deep discharge if the AC mains voltage is down for a longer period. If the battery is deeply discharged, it may be destroyed, and the system will not be protected from mains power outages anymore.

The third module 3 is a first load connection module A4 to be mounted to the rail and for connection to a first load. On its first side, the first load connection module A4 comprises a second connector 12 of the second connection interface CI2. On its second side the first load connection module A4 comprises a third connector 13 of the second connection interface CI2. The second connector 12 of the first load connection module A4 is connected to first connector 11 on the second side of the battery connection and LVBD contactor module A2.

The first and second connection interfaces CI1, CI2 comprises DC power terminals for transferring DC power and signal terminals (not shown) for transferring control signals between the modules.

When all modules 3 have been connected to each other and fixed to the rail, the equipment 4 is connected on the outside of the modules 3.

In FIG. 4 it is shown that four AC/DC converters B1 are connected on the outside of the AC/DC converter and controller module A1. Moreover, one controller B2 is connected on the outside of the AC/DC converter and controller module A1.

The load is connected by means of cables etc to one or several MCBs (Miniature Circuit Breaker) provided on the first load connection module A4. There may be several MCBs on the first load connection module A4, for connection of more than one load to the first load connection module A4.

The battery is connected by means of cables etc to one or several MCBs provided on the first battery connection and LVBD contactor module A2. Also here there may be several MCBs, for connection of more than one battery to the first battery connection and LVBD contactor module A2. It should also be noted that the term "battery" here may comprise one or several interconnected batteries.

As shown in FIG. 4, covers C may be mounted outside the modules A2 and A4 for protection.

Alternative Embodiment

A1-A2-A5

In an alternative embodiment, the load connection module A4 may be a load connection and LD (Load Disconnect) contactor module A5. The load connection and LVD contactor module A5 comprises an LD (Load Disconnect) contactor provided for controlled connection or disconnection of the load being connected to the load connection and LD contactor module A5. In this embodiment, it is the controller B2 that, based on certain conditions, performs the actuation of the LD contactor.

Alternative Embodiment

A1-A2-A4-A5

In an alternative embodiment, the power supply system may comprise one load connection module A4 and one subsequent load connection and LD contactor module A5, i.e. A4 is connected on the second side of A2, and A5 is connected to the second side of A4. A first load is connected to A4, and a second load is connected to A5.

Hence, a prioritized sequence of loads is achieved. The first priority load is the first load connected to A4, and the second priority load is the second load connected to A5.

The second priority load can be disconnected by controlling the LD contactor of A5. In this case, the battery supplies all its power to prioritized load only. This is explained more in detail with reference to the embodiment below.

Alternative Embodiment

A1-A2-A4$_1$-A5-A4$_2$

This embodiment is based on the embodiment above. The load connection module A4 above is here denoted as first load connection module A4$_1$. In this alternative embodiment, a second load connection module A4$_2$ may be connected on the second side of the load connection and LD contactor module A5, i.e. to the third connector 13 of the load connection and LD contactor module A5.

If such load connection modules are present subsequent to (i.e. to the right of) the load connection and LD contactor module A5, also these loads will be connected or disconnected by actuation of the LD contactor.

Consequently, one or more load connection modules A4 or load connection and LD contactor modules A5 may be connected subsequent to the first load connection module A4/A5 for connection of more loads to the power supply system.

Second Embodiment

A1-A2-A3-A4$_1$-A5-A4$_2$

Figure 5:
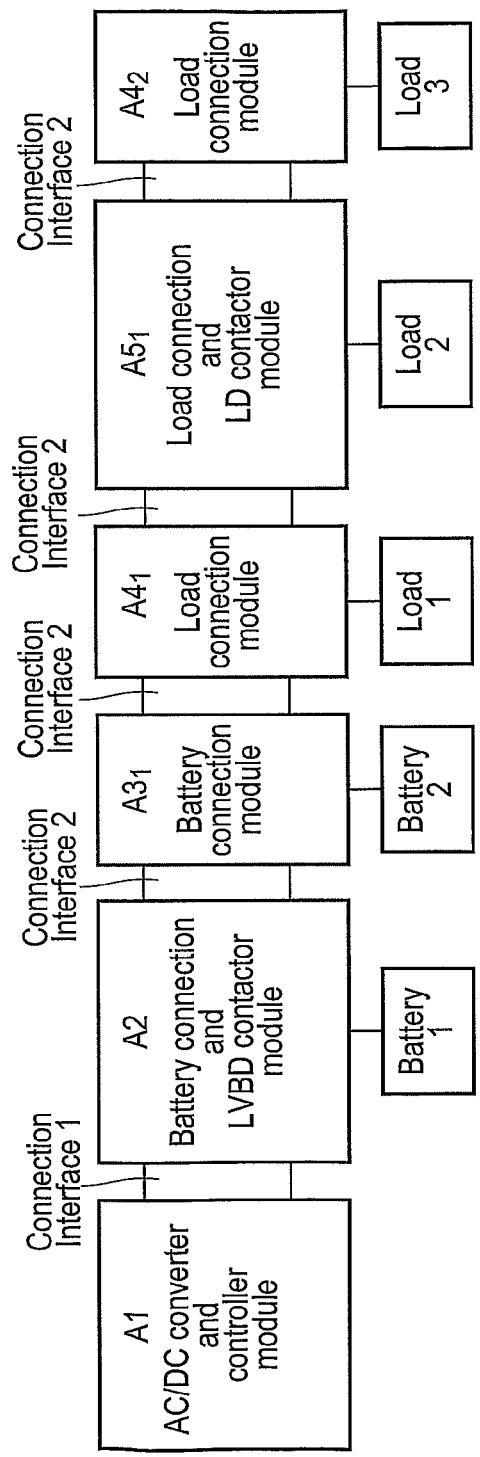
FIG. 5 illustrates a block diagram of a second embodiment.
Figure 6:
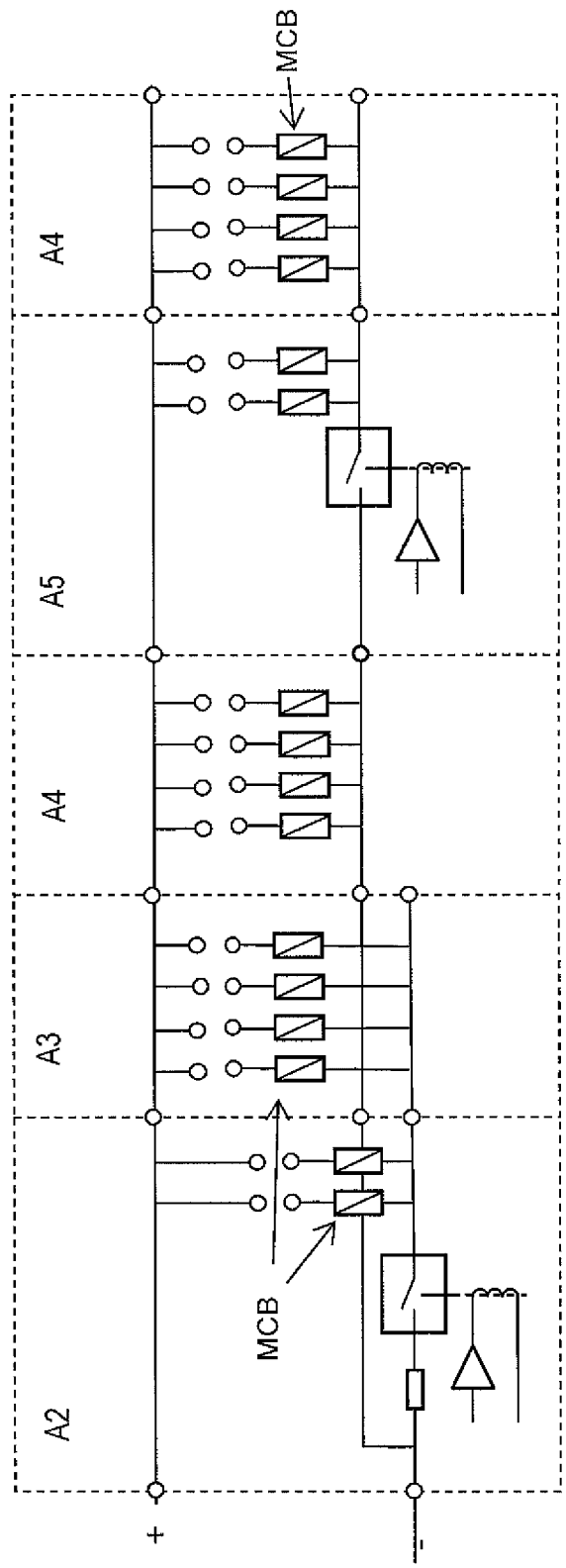
FIG. 6 illustrates an electrical connection diagram of the second embodiment.

It is now referred to FIGS. 5 and 6.

A first battery connection module A3$_1$ may be connected between the battery connection and LVBD contactor module A2 and the first load connection module A4 for connection of more batteries to the power supply system. The battery connection module comprises a fourth connector 14 on its first side and a fifth connector 15 on its second side, as shown in FIG. 7b, where the fourth connector 14 is connected to the first connector of the battery connection and LVBD contactor module A2 and the fifth connector 15 is connected to the second connector 12 of the first load connection module A4.

In this embodiment, a load connection and LD contactor modules A5$_1$ is connected subsequent to the first load connection module A4. Moreover, a second load connection module A4$_2$ is connected subsequent to the load connection and LD contactor modules A5$_1$.

Consequently, batteries 1 and 2 may be connected to two different modules (i.e. to A2 and A3 respectively) of the power supply system. Moreover, loads 1, 2, 3 may be connected to three different modules (i.e. to A4$_1$, A5$_1$ and A4$_2$ respectively). Note that the numbers of loads 1-3 here indicate which module they are connected to, not necessarily the number of individual equipment units that are connected. As mentioned above, one load module may comprise several MCBs for connection of different loads.

Here, the batteries 1 and 2 are disconnected by controlling the LVBD contactor of A2. Moreover, by controlling the LD contactor of A5, the load subsequent to A5 (i.e. connected to A5-A4$_2$) is disconnected.

Hence, a prioritized sequence of loads is achieved. The first priority load is here the load denoted Load 1 connected to the first load connection module A4$_1$ in FIG. 5. The second priority load is here the load denoted Load 2 and Load 3 connected to the load connection and LD contactor module A5 and the second load connection module A4$_2$ respectively. Consequently, if the LD contactor of A5 is disconnected, only the first priority load is supplied with power. This would for example be the case if a failure in the AC mains is detected and there is limited battery capacity. The controller B2 could then switch off the second priority load immediately, or after a predetermined period of time, to save battery capacity for the first priority load.

Moreover, if the controller detects that the AC mains is functioning again, the LD contactor of A5 may be kept disconnected until the AC/DC converter has recharged the batteries.

It is now referred to FIGS. 7a and 7c. It should be noted that the second connection interface CI2 between the modules A2, A3, A4 and A5 comprises four different connectors (i.e. the first connector 11, the second connector 12, the third connector 13, the fourth connector 14 and the fifth connector 15, where the first and fifth connectors 11 and 15 are equal). It should be noted that these connectors have been designed with a view to only make it possible to connect allowable combinations of modules to each other.

The second connector 12 of the load connection module may be connected to the first connector 11, the fifth connector 15 or the third connector 13 of other modules. The fourth connector 14 of a battery connection module may be connected to the first connector 11 or a fifth connector 15 of another module, but may not be connected to the third connector 13 of the load connection modules A4 or A5.

Hence, the load connection modules A4 or A5 or battery connection modules may be connected to A2. Moreover, the load connection modules A4 or A5 may be connected to A3. And further, the load connection modules A4 or A5 may be connected together with other load connection modules A4 or A5, while battery connection modules A3 may be connected to other battery connection modules A3. However, it is not possible to connect battery connection modules A3 subsequent to load connection modules A4 or A5.

In the present embodiments, the DC power terminals of the first, third and fifth connectors 11, 13, 15 are female connectors and the DC power terminals of the second and fourth connectors 12, 14 are male connectors. Of course, the opposite would also be possible.

In FIG. 7a-c, the first, fourth and fifth connectors 11, 14, 15 comprise three DC power terminals, a positive terminal, a negative load terminal and a negative battery terminal. The second and third connectors (12, 13) comprise two DC power terminals: the positive terminal, and the negative load terminal.

According to one or more embodiments of the invention, it is easy for an operator to assemble the power supply system by fixing the modules to the rail. Moreover, the power system is highly reconfigurable since new modules can be ordered and fixed to the rail in their allowable positions.

Alternative Embodiments

It should be noted that the AC/DC converter and controller module A1 may be designed for only one, or for two AC/DC converters B1. In fact, any number of AC/DC converters is possible; however, a number of 1-6 will be sufficient for most practical applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. Power supply system for mounting to a rail comprising an AC/DC converter for converting high voltage AC power to low voltage DC power; a controller for controlling the power supply system; wherein the system comprises:
   a rail, wherein the rail is a metallic beam;
   an AC/DC converter and controller module for mounting to the rail and for connection to the AC/DC converter and controller respectively;
   a battery connection and LVBD contactor module for mounting to the rail and for connection to a first battery, wherein a first side of the battery connection and LVBD contactor module interlocks with a side of the AC/DC converter and controller module by a first connection interface and wherein the battery connection and LVBD contactor module on a second side, opposite of the first side, comprises a first connector of a second connection interface; and
   a first load connection module for mounting to the rail and for connection to a first load, wherein the first load connection module on a first side comprises a second connector of the second connection interface and on a second side, opposite of the first side, comprises a third connector of the second connection interface, wherein the second connector of the first load connection module interlocks with the first connector on the second side of the battery connection and LVBD contactor module;
   wherein the LVBD contactor of the battery connection and LVBD contactor module is provided for controlled connection or disconnection of the first battery,
   wherein the first and second connection interfaces comprise DC power terminals for transferring DC power and signal terminals for transferring control signals, and
   wherein each of the AC/DC converter and controller module, the battery connection and LVBD contactor module, and the first load connection module are mounted along the rail with a fastener.

2. The power supply system according to claim 1, wherein the first load connection module is a load connection and LD contactor module comprising an LD contactor provided for controlled connection or disconnection of the load being connected to the load connection and LD contactor module.

3. The power supply system according to claim 2, wherein one or more load connection modules or load connection and LD contactor modules are connected subsequent to the first load connection module for connection of more load to the power supply system.

4. The power supply system according to claim 1, wherein a battery connection module is mounted to the rail and is connected between the battery connection and LVBD contactor module and the first load connection module for connection of more batteries to the power supply system.

5. The power supply system according to claim 4, wherein the battery connection module on a first side comprises a fourth connector for connection to the first connector of the battery connection and LVBD contactor module and on a second side, opposite of the first side, comprises a fifth connector equal to the first connector for connection to the second connector of the first load connection module.

6. The power supply system according to claim 5, wherein the second connector of one of the AC/DC convertor and controller module, the battery connection and LVBD contactor module, and the first load connection module may be connected to the first connector, the fifth connector or the third connector of another of the AC/DC convertor and controller module, the battery connection and LVBD contactor module, and the first load connection module.

7. The power supply system according to claim 5, wherein the fourth connector of one of the AC/DC convertor and controller module, the battery connection and LVBD contactor module, and the first load connection module is connected to the first connector or the fifth connector of another module, but is not connected to the third connector of another of the AC/DC convertor and controller module, the battery connection and LVBD contactor module, and the first load connection module.

8. The power supply system according to claim 5, wherein the DC power terminals of the first, third and fifth connectors are female connectors and the DC power terminals of the second and fourth connectors are male connectors or vice versa.

9. The power supply system according to claim 5, wherein the first, the fourth and the fifth connectors comprise three DC power terminals, a positive terminal, a negative load terminal and a negative battery terminal.

10. The power supply system according to claim 9, wherein the second and third connectors comprise two DC power terminals: the positive terminal, and the negative load terminal.

11. The power supply system according to claim 1, wherein the load is connected to the load connection module by one or several miniature circuit breakers.

12. The power supply system according to claim 1, wherein the battery is connected to the battery connection and LVBD contactor module.

13. The power supply system according to claim 1, wherein the AC/DC converter and controller module is connected to several AC/DC converters.

14. The power supply system according to claim 2, wherein subsequent load connection modules are connected to the third connector on the second side of the load connection and LD contactor module.

15. The power supply system according to claim 1, wherein the battery is connected to the battery connection module, by one or several miniature circuit breakers.

16. The power supply system according to claim 1, wherein each of the AC/DC converter and controller module, the battery connection and LVBD contactor module, and the first load connection module are mounted perpendicular to the rail with a fastener.

17. The power supply system according to claim 1, wherein the AC/DC converter and controller module, the battery connection and LVBD contactor module, and the first load connection module are mounted to the rail on a rear side of each of the AC/DC converter and controller module, the battery connection and LVBD contactor module, and the first load connection module.

18. The power supply system according to claim 1, wherein the AC/DC converter and controller module, the battery connection and LVBD contactor module, and the first load connection module are mounted to the rail on an opposite side of a rear side of each of the AC/DC converter and controller module, the battery connection and LVBD contactor module, and the first load connection module.

19. The power supply system according to claim 1,
wherein the AC/DC converter and controller module, the battery connection and LVBD contactor module, and the first load connection module are connected to each other on the rail, and
wherein the first connector interface and the second connector interface only allows a connection of the AC/DC converter and controller module, the battery connection and LVBD contactor module, and the first load connection module in specific allowable positions.

20. The power supply system according to claim 19, wherein a prioritized sequence of loads is achieved by manually changing a configuration of the connection of the AC/DC converter and controller module, the battery connection and LVBD contactor module, and the first load connection module between based on specific allowable positions.

* * * * *